(12) United States Patent
Saride et al.

(10) Patent No.: US 12,348,501 B2
(45) Date of Patent: Jul. 1, 2025

(54) INTER-NETWORK IMS REGISTRATION

(71) Applicant: T-Mobile USA, Inc., Bellevue, WA (US)

(72) Inventors: Prannoy Kiran Saride, Bellevue, WA (US); Raymond Thomas Ball, Seattle, WA (US); Kenroy Dwight Shaw, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 420 days.

(21) Appl. No.: 17/812,557

(22) Filed: Jul. 14, 2022

(65) Prior Publication Data
US 2024/0022551 A1 Jan. 18, 2024

(51) Int. Cl.
*H04L 9/40* (2022.01)

(52) U.S. Cl.
CPC .................... *H04L 63/08* (2013.01)

(58) Field of Classification Search
CPC . H04L 63/08; H04L 65/1016; H04L 65/1104; H04W 8/02
See application file for complete search history.

(56) References Cited

U.S. PATENT DOCUMENTS

| | | | |
|---|---|---|---|
| 2011/0188397 A1* | 8/2011 | McCann | H04L 43/00 370/252 |
| 2016/0057607 A1* | 2/2016 | Dubesset | H04W 8/04 455/433 |
| 2017/0064544 A1 | 3/2017 | Youn | |
| 2020/0358909 A1* | 11/2020 | Ahmadi | H04L 65/1016 |
| 2021/0227357 A1 | 7/2021 | Yau | |

OTHER PUBLICATIONS

Extended European Search Report mailed Dec. 15, 2023 for European Application No. 23183773.3, a foreign counterpart to U.S. Appl. No. 17/812,557, 10 pages.
GSM Association, "VoLTE Service Description and Implementation Guidelines" Version 1.1, Mar. 26, 2014, pp. 1-121.

* cited by examiner

*Primary Examiner* — Eugene Yun
(74) *Attorney, Agent, or Firm* — Lee & Hayes, P.C.

(57) ABSTRACT

System and methods for inter-network user equipment (UE) registration are described herein. A managed access system (MAS) network may receive a request for services from an unauthorized UE and may generate a registration request that it transmits to the UE's home network using a call session control function (CSCF) and the Cx interface. One or more diameter routing agents on the path between the MAS network and the destination network may determine whether the registration request was received on the Cx network and if not, may discard the message. Other criteria may also be used to determine whether to forward such requests.

20 Claims, 5 Drawing Sheets

INTER-NETWORK IMS REGISTRATION

BACKGROUND

The number of wireless communications devices (e.g., user devices such as mobile telephones, smartphones, tablets, laptops, etc.) in use has rapidly grown in recent years. The networks that provide services to such devices have grown to accommodate them. Wireless communications devices are nearly ubiquitous, even in places where they are prohibited by law and/or applicable regulations or policies, such as correctional facilities (e.g., prisons, jails) and other secured areas (sensitive military areas, classified locations, area where such devices are prohibited for reasons of national security, etc.). To control the use of unauthorized user devices (e.g., contraband devices) while allowing the use of authorized devices, operators of such facilities and areas may use managed access systems (MAS) to provide wireless communications services to authorized wireless communications devices within such facilities and areas while blocking or otherwise preventing unauthorized wireless communications devices from accessing wireless communications services.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

This disclosure is directed in part to systems and techniques for performing for inter-network registration in specialized wireless communications networks and other networks that perform access restrictions, such as managed access systems (MASs), MAS networks, and MAS Evolved networks. Such networks include any networks that may facilitate wireless communications services for a particular set of one or more wireless communications devices while prohibiting, inhibiting, or otherwise preventing the provision of wireless communications services for another particular set of one or more wireless communications devices. Such networks include networks that support one or more 3GPP standards, including, but not limited to, Long Term Evolution (LTE) networks (e.g., 4G LTE networks) and New Radio (NR) networks (e.g., 5G NR networks). However, the disclosed systems and techniques may be applicable in any network or system in which a user device may request and receive access to communicate with network and/or remote devices using any protocol.

In conventional systems, a wireless user device may wirelessly communicate with a base station (e.g., gNodeB, eNodeB, NodeB, base transceiver station (BTS), etc.) to request wireless communications services. The base station may be a component within a "home" network for the user device, such as a Public Land Mobile Network (PLMN) that is operated by a mobile network operator that is associated with the wireless user device (e.g., a "home" PLMN or "HPLMN"). Alternatively, this base station may be a component within a network that is "foreign" to the user device or otherwise operated by a mobile network operator that is not associated with the wireless user device. Such a network may be referred to as a "visiting" PLMN or "VPLMN." Devices connected to or otherwise communicating with a VPLMN or other network that is not a home network for the device may be referred to as "roaming."

When a user device connects to a VPLMN, authentication and registration of the device is typically performed on a home network for the device. In such situations, authentication and/or registration requests are routed by the VPLMN to a home network for the device. A user device's home network may be identified by a PLMN identifier (PLMN ID) that may be included in, or determined from, messages sent by the user device. For example, a base station or other component on a VPLMN may determine a user device's HPLMN based on an International Mobile Subscriber Identity (IMSI) provided by the user device that may include a mobile network code (MNC) that may identify the user device's home network or PLMN.

In MAS networks and other restricted access networks (referred to herein as MAS networks), components of such networks may be configured to allow or facilitate communications for particular devices only while blocking communications for all other devices. This may take the form simply blocking or otherwise barring any devices not explicitly authorized. For example, a MAS network may include one or more "jamming" components that interfere with or otherwise inhibit wireless communications on certain frequencies while not interfering with wireless communications on other frequencies. This may allow particular devices operating on the allowed frequencies to operate in a MAS network while blocking other particular devices (e.g., devices that operate on typical wireless network frequencies). However, this may also prevent desired, legitimate wireless communications, such as by wireless user devices operated by employees, guests, and other personnel authorized to wirelessly communicate in the MAS network environment.

In another example, a base station and/or one or more other components or functions may be configured with a list of authorized devices and may only route traffic and/or signaling from such devices, blocking or ignoring signaling and traffic from any devices not explicitly indicated as authorized. However, simply blocking all unauthorized wireless communications may provide information that an operator of a MAS network may use to determine that unauthorized user devices are present in the MAS network environment. For example, the operator may wish to determine whether there are unauthorized devices attempting to communicate wirelessly in a prison and, if so, information associated with such devices that may be used to locate the device and/or one or more associated users.

To address these issues while maintain control of wireless communications on a MAS network, the disclosed systems and methods allow for the authentication and/or registration of both authorized and unauthorized user wireless devices, while preventing further wireless communications for unauthorized devices. By allowing authentication and/or registration of unauthorized devices as described herein, a MAS network operator may obtain information about such devices that may be used to locate the devices and/or identify associated users. Furthermore, the disclosed systems and methods prevent such devices from performing further wireless communications activities beyond authentication and/or registration, thereby maintaining the operational security of the MAS network and ensuring that users of such devices are prohibited from engaging in unauthorized communications.

In various examples, a wireless user device may communicate with a base station configured at a MAS network. This user device may not be a device authorized to use the MAS network for wireless communications. The MAS network is not a home network for the user device and therefore may be a VPLMN for the user device. The user device may send a request for authentication and/or registration to the MAS network via the base station. Rather than simply blocking communications with the unauthorized wireless user device (or routing the request to a home network for the user device and initiating a Call Session Control Function (CSCF) operation at the home network as may be done in atypical wireless network environment), components on the MAS network may initiate or otherwise perform a CSCF operation to interact with a home network (e.g., HPLMN) of the user device to register the device at the home network. The CSCF on the MAS network may use the Cx interface to perform registration and authentication communications for the user device between the MAS network and the device's HPLMN (e.g., the IMS network associated with the HPLMN).

In various examples, one or more Diameter Routing Agents (DRAs) may be used to determine and limit signaling between the MAS network and other networks. For example, a DRA configured at the interface between the MAS network and one or more other networks (e.g., at the interface to an IP exchange ("IPX")). This DRA may allow Cx signaling to and/or from such an interface and may block (e.g., all) other signaling (e.g., for unauthorized devices or for all devices). Similarly, a DRA may be configured at an HPLMN (e.g., of an unauthorized wireless user device) and may also, or instead, allow Cx signaling to and/or from an IPX interface (e.g., signaling associated with the MAS network) and may block (e.g., all) other signaling (e.g., for unauthorized devices or for all devices). In this way, an unauthorized device attempting to operate in a MAS network is permitted to register with its home network, allowing the determination (e.g., in the MAS network) of home network and other information associated with the unauthorized device, while preventing the use of the unauthorized device for unsanctioned communications.

By facilitating the more efficient and accurate determination of unauthorized user devices attempting to operate in a restricted environment such as that of a MAS network, while facilitating prevention of effective communications using such devices, the systems and methods described herein can improve the performance and increase the efficiency of both network and operator resources. For example, the methods and systems described herein may be more efficient and/or more robust than conventional techniques, as they may facilitate the capture of unauthorized device information while also automating the prevention of the exchange of communications traffic with unauthorized devices. That is, the methods and systems described herein provide a technological improvement over existing unauthorized device determination and blocking systems and processes by facilitating improved device data capture and increasing network efficiency by reducing the traffic associated with unauthorized devices that may be processed by a MAS network. In addition to improving the efficiency of network and device resource utilization, the systems and methods described herein can provide more robust systems by, for example, making more efficient use of network devices by reducing unnecessary and/or unproductive device and network signaling and processing associated with unauthorized devices, thereby freeing network and device resources for more productive operations.

Illustrative environments, signal flows, and techniques for implementing systems and methods for inter-network registration are described below. However, the described systems and techniques may be implemented in other environments.

Illustrative System Architecture

Figure 1:
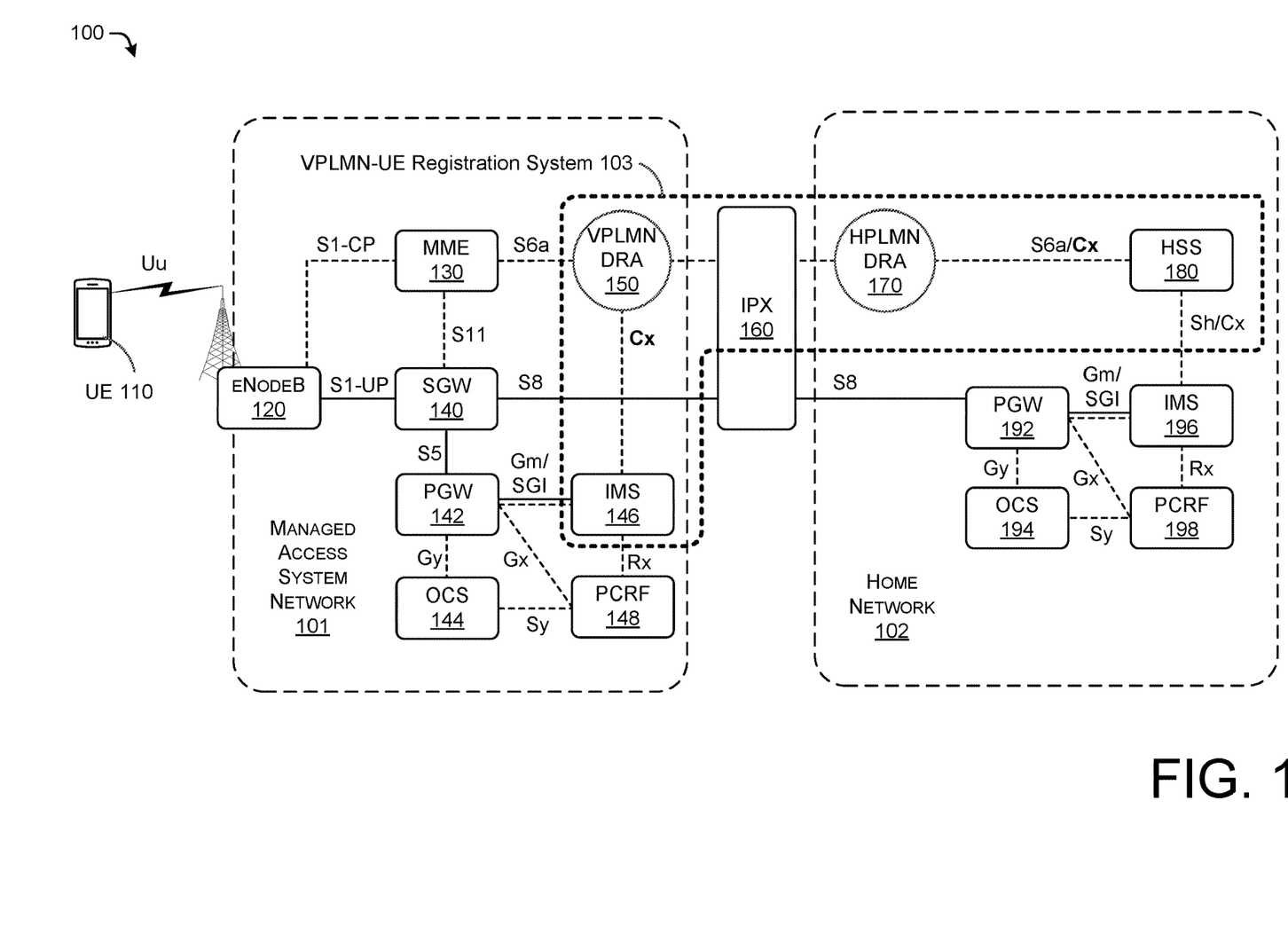
FIG. 1 is a schematic diagram of an illustrative wireless communications network environment in which systems and methods for inter-network registration may be implemented, in accordance with examples of the disclosure.

FIG. 1 is a schematic diagram of an illustrative wireless network environment 100 in which the disclosed systems and techniques may be implemented. The environment 100 may include a UE 110 that may wirelessly communicate with an eNodeB 120. While referred to as an "eNodeB" for explanatory purpose herein, the eNodeB 120 may be any type of base station, including, but not limited to, any type of BTS, NodeB, eNodeB, gNodeB, etc. The eNodeB 120 may communicate with other devices and elements in a MAS network 101. The MAS network 101 may be any one or more networks that facilitate communications between particular devices of various types, such as computing device and mobile devices (e.g. UEs), while restricting or inhibiting communications between other particular devices. For example, the MAS network 101 may be configured at a correctional facility. Various connections between devices in the MAS network 101 may be wired, wireless, or a combination thereof. In various embodiments, the MAS network 101 may facilitate authorized communications with one or more wireless devices, such as UEs, and may prevent unauthorized communications. In examples, the MAS network 101 may facilitate authorized packet-based communications between such wireless devices and devices on the Internet and/or one or more IP multimedia subsystems (IMSs).

In FIG. 1, physical connections between components may be indicated by solid lines while logical connections between components may be indicated by dashed lines. Relevant interfaces may also be indicated. For example, eNodeB 120 may be physically connected to a serving gateway (SGW) 140 and may communicate with the SGW 140 using the S1 user plane (S1-UP) interface. The eNodeB 120 may be logically connected to a mobility management entity (MME) 130 and may communicate with the MME 130 using the S1 control plane (S1-CP) interface. The MME 130 may logically connect to the SGW 140 and communicate with it using the S11 interface, and so forth. Note that the interfaces and types of communications connections illustrated in FIG. 1 are exemplary only and do not limit the embodiments of the disclosed systems and methods contemplated. For example, any logical connection illustrated in this figure may also, or instead, be a physical connection and vice versa. Any interface specified is an example interface and one or more other interfaces and/or means of communications may be used to perform the disclosed communications techniques. All such embodiments, and any combinations thereof, are contemplated as within the scope of the instant disclosure.

For authorized user devices, components of the MAS network 101 may perform the typical functions of a wireless network for those user devices for which MAS network 101 may be their home network. For example, the MME 130 may manage UE access, establish bearer paths, activate and/or deactivate bearers, select gateways, authenticate users, etc.; SGW 140 and PGW 142 may perform gateway functions; online charging system (OCS) 144 may perform online charging function (OCF) operations and related operations; policy and charging rules function (PCRF) 148 may determine and/or apply policies and rules and perform related operations; IMS 146 may provide or otherwise facilitate the delivery of IP multimedia services, etc.

In various examples, the MAS network 101 may include one or more DRAs. As the MAS network 101 is a visiting PLMN (VPLMN) from the perspective of the UE 110, in this example the DRA 150 may be referred to as a "VPLMN DRA." The DRA 150 may be a proxy and/or redirect agent that routes and facilitates authentication, authorization and accounting (AAA) signaling and traffic.

A home network 102 illustrated in FIG. 1 may represent a home network or home PLMN (HPLMN) for associated devices. For example, the home network 102 may be the home network associated with the UE 110. Components of the home network 102 may perform the typical functions of a home network. For example, the PGW 192 may perform packet gateway functions; OCS 194 may perform OCF operations and related operations; PCRF 198 may determine and/or apply policies and rules and perform related operations; IMS 196 may provide or otherwise facilitate the delivery of IP multimedia services, etc. The home subscriber server (HSS) 180 may perform user authentication and authorization operations, maintain user profiles and information, verify user identities, register user devices, etc. For example, the HSS 180 may maintain records associated with a user associated with the UE 110.

In various examples, the home network 102 may include one or more DRAs. As the home network 102 is an HPLMN for the UE 110, in this example the DRA 170 may be referred to as a "HPLMN DRA." The DRA 170 may be a proxy and/or redirect agent that routes and facilitates authentication, authorization and accounting (AAA) signaling and traffic.

The home network 102 and the MAS network 101 may communicate and exchange traffic via IPX 160, which may facilitate the exchange of traffic between networks operated by different operators. The IPX 160 may also, or instead, facilitate the exchange of traffic between home network 102 and one or more other networks and/or between MAS network 101 and one or more other networks. The IPX 160 may also represent a direct connection between the home network 102 and the MAS network 101 that does not include connectivity to other networks.

In various examples, the UE 110 may be a device that is not authorized to access wireless communications services in the environment served by the MAS network 101. The UE 110 may send a request for services to the MAS 110. This request may be a request for IMS services. Rather than forwarding this request to the home network 102 for handling (e.g., as may be performed in a typical wireless networking environment), in various examples, the MAS network 101 may route this request to the PGW 142 and/or the IMS 146 where it may be handled by a CSCF that performs operations related to authorizing, setting up, establishing, modifying, and tearing down multimedia sessions. This may be performed based on determining by one or more components and/or functions of the MAS network 101 that the request is associated with an unauthorized user device (the ULE 110). In this example, the CSCF may operates across both the MAS network 101 and the home network 102, as described in more detail herein. The CSCF may be implemented using any one or more suitable components of the MAS network 101, such as, but not limited to, the PGW 142 and the IMS 146.

The virtual and/or physical components that may be included in performing inter-network registration as described herein may be include those indicated by the VPLMN-UE registration system 103 shown in FIG. 1. Note, however, that other components may be included in such a system and components shown in this system may be excluded in various embodiments. All such examples are contemplated as within the scope of the instant disclosure.

For example, an initial operation that the CSCF may perform in such a system is requesting to register the UE 110 at an HSS (e.g., its home network HSS 180). This registration request may be a Multimedia Authentication Request (MAR). The CSCF operating in the MAS network 101 may determine a home network (e.g., home network 102) associated with the source of the request for services (e.g., UE 110). The CSCF may then generate and transmit a MAR for the UE 110 to the determined home network 102 and/or to HSS 180 for the determined home network.

This generated MAR may be transmitted to the home network 102 via the VPLMN DRA 150 towards the IPX 160. The DRA 150 may be configured to evaluate signaling and/or other traffic that it receives to determine whether to transmit such signaling and/or traffic to the IPX 160 based on the interface associated with such signaling and/or traffic. For example, the DRA 150 may be configured to only exchange (transmit and/or receive) signaling associated with the Cx interface with the IPX 160. The DRA 150 may be configured to restrict or otherwise drop any other traffic.

In this example, the CSCF may transmit the MAR for the UE 110 to the DRA 150 using the Cx interface. Recognizing the Cx interface, the DRA 150 may transmit the MAR to the IPX 160 for relay to the home network 102.

The home network 102 may also, or instead, be configured with HPLMN DRA 170 that may also be configured to evaluate signaling and/or other traffic that it receives to determine whether to transmit such signaling and/or traffic to the IPX 160 based on the interface and/or the remote network associated with such signaling and/or traffic. For example, the DRA 170 may be configured to only exchange (transmit and/or receive) signaling associated with the MAS network 101 if such traffic is received on the Cx interface. The DRA 170 may be configured to restrict or otherwise drop any other traffic associated with the MAS network 101.

In this example, the DRA 170 may receive the MAR for the ULE 110 from the MAS network 101 via the IPX 160 using the Cx interface. Recognizing the Cx interface and that the source network is the MAS network 101, the DRA 170 may forward the MAR to the HSS 180 for registration of the UE 110.

The HSS 180 may perform registration of the UE 110 and may reply with a confirmation or other message indicating whether the UE 110 has been registered. For example, the HSS 180 may generate and transmit a Multimedia Authentication Answer (MAA) to the MAS network 101 (e.g., to the CSCF operating in the MAS network 101).

The MAA may be passed to the CSCF operating in the MAS network 101 via the HPLMN DRA 170, the IPX 160, and/or the VPLMN DRA 150. The HSS may use the Cx interface for the MAA. The DRAs 150 and 170 may again the MAA to ensure that it is associated with the Cx interface before forwarding the MAA towards the intended destination.

Alternatively, a DRA may only verify interface and/or associated network in one direction. For example, DRA 150 may only determine that traffic intended for IPX 160 (e.g., for networks outside of the MAS network 101) is associated with the Cx interface before transmitting such traffic beyond the MAS network 101. In such examples, the DRA 150 may receive traffic from the IPX 160 (e.g., from networks outside of the MAS network 101) and forward such traffic to destinations within the MAS network 101 regardless of interface. Similarly, DRA 170 may only determine that traffic intended for IPX 160 (e.g., for networks outside of the home network 102) is associated with the Cx interface (e.g., and also associated with the MAS network 101) before transmitting such traffic to the MAS network 101. In such examples, the DRA 170 may receive traffic from the IPX 160 (e.g., from networks outside of the home network 102) and forward such traffic to destinations within the home network 102 regardless of interface or source.

An MAA may be forwarded to the UE 110, which may then consider itself properly registered. However, because the DRA 150 may be configured to drop any other type of traffic associated with the UE 110, the UE 110 may remain unable to communicate with devices beyond the MAS network 101, as intended. One or more components within the MAS network 101 may record or store data associated with the MAA and/or the MAR associated with the UE 110 for use in determining an identity and/or location of the UE 110 and/or a user associated with the UE 110.

Illustrative Signal Flows

Figure 2:
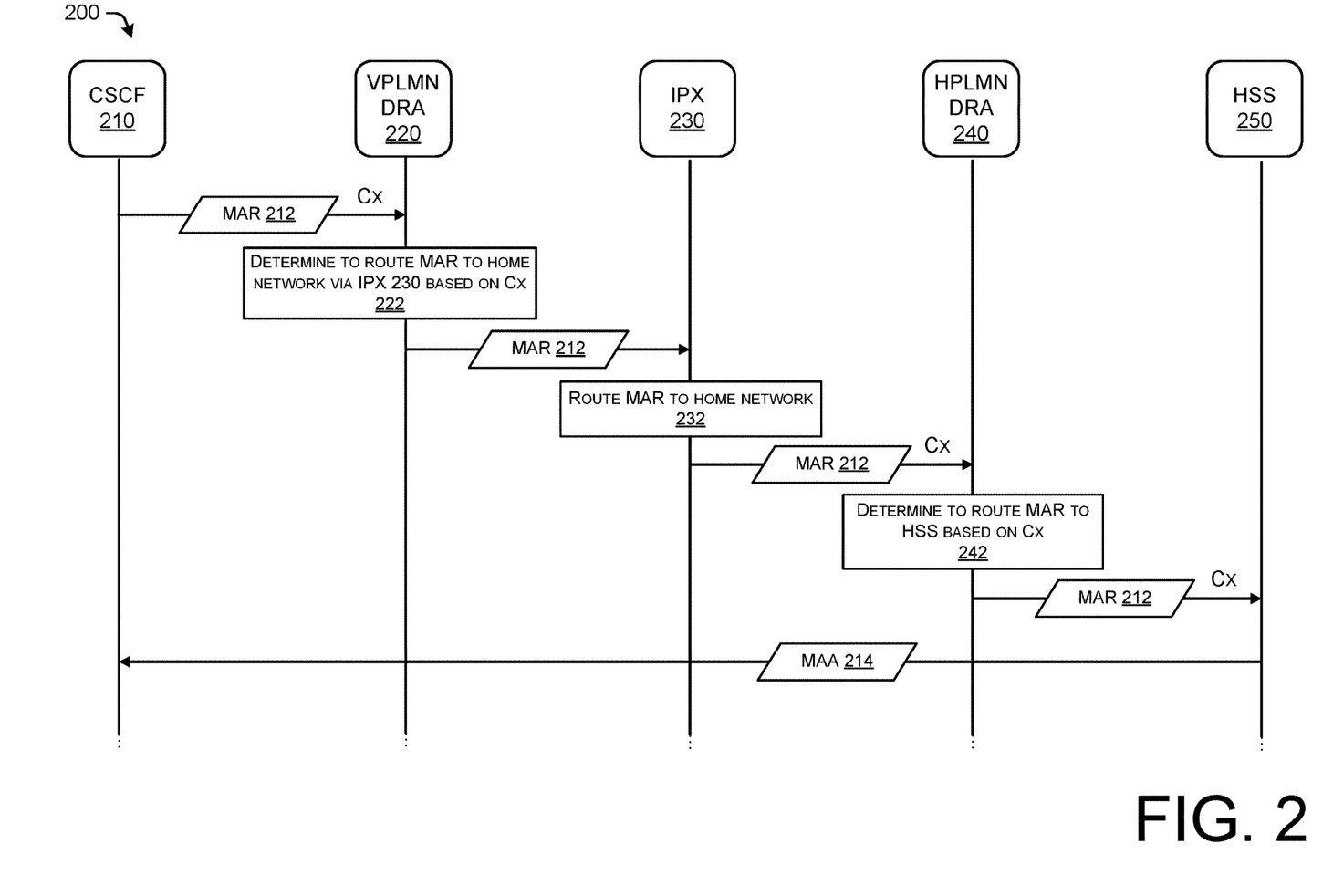
FIG. 2 is a diagram of an illustrative signal flow associated with systems and methods for inter-network registration, in accordance with examples of the disclosure.

FIG. 2 illustrates an exemplary signal flow 200 of various messages that may be exchanged in one or more of the disclosed systems and techniques for performing inter-network registration as described herein. Reference may be made in this description of the signal flow 200 to devices, messages, and operations illustrated in FIG. 1 and described in regard to that figure. However, the operations, signals, and signal flow illustrated in FIG. 2 and described herein may be implemented in any suitable system and/or with any one or more suitable devices and/or entities. Moreover, any of the operations, signals, and/or entities described in regard to FIG. 2 may be used separately and/or in conjunction with other operations, signals, and/or entities. All such embodiments are contemplated as within the scope of the instant disclosure.

A CSCF 210 may be configured to perform operations in one or more wireless networks, one or more of which may be a restricted access network. For example, the CSCF 210 may be configured in a MAS network such as the MAS network 101 of FIG. 1. In response to receiving a request for IMS services (e.g., a session initiation protocol (SIP) request) from a UE, the CSCF 210 may determine a home network and/or HSS associated with the ULE and generate a MAR 212 requesting registration of the UE. The CSCF 210 may transmit the MAR 212 to a VPLMN DRA 220 (e.g., for further transmission to the destination home network). At operation 222, the DRA 220 may determine whether the MAR 212 is associated with the Cx interface. If not, the DRA 220 may drop the MAR 212. If the DRA 220 determines that the MAR 212 was received on the Cx interface, the DRA 220 may transmit the MAR 212 to the IPX 230 (e.g., for further transmission to the destination home network).

The IPX 230 may determine a destination network and/or device for the MAR 212 at operation 232 and may forward the MAR 212 to the determined destination. As an initial or first node within the home network, the HPLMN DRA 240 may receive the MAR 212 from the IPX 230. At operation 242, the DRA 240 determine whether the MAR 212 is associated with the Cx interface. In some examples, the DRA 240 may also determine whether the MAR 212 is associated with the network with which the CSCF is associated. If the DRA 240 determines that the MAR 212 is not associated with the Cx interface (e.g., and with the CSCF's network), the DRA 240 may drop the MAR 212. If the DRA 220 determines that the MAR 212 meets the criteria for continued transmission, (e.g., was received on the Cx interface and/or from an appropriate network), the DRA 240 may transmit the MAR 212 to the HSS 250 (e.g., for registration evaluation and operations).

The HSS 250 may determine whether to register the associated UE based on the MAR 212 and/or may perform one or more registration operations based on the MAR 212. Based on such operations, the HSS 250 may generate and transmit an MAA 214 to the CSCF 210.

The MAA 214 may be transmitted by the same components (e.g., 240, 230, 220) to the CSCF 210. At one or more of such components (or other components), the MAA may be further evaluated to determine if it is associated with the Cx interface and/or if it is associated with an authorized network (omitted from figure). Alternatively, the MAA may be provided to the CSCF 210 regardless of interface and/or network, relying on the initial checking of the MAR 212 to ensure that the registration request was permitted.

Illustrative Operations

Figure 3:
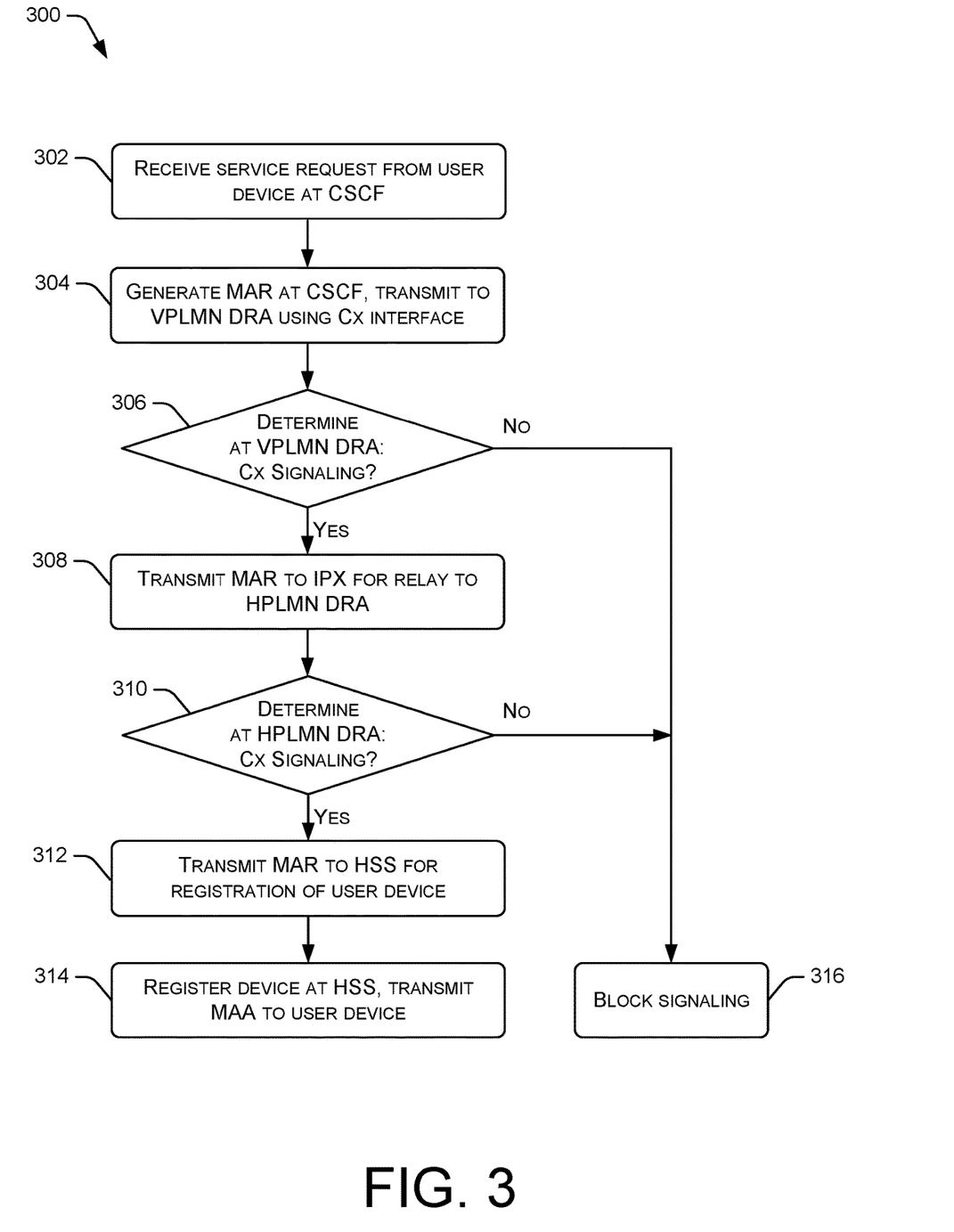
FIG. 3 is a flow diagram of an illustrative process for performing inter-network registration, in accordance with examples of the disclosure.

FIG. 3 shows a flow diagram of an illustrative process 300 for performing inter-network registration according to the disclosed embodiments. The process 300 is illustrated as a collection of blocks in a logical flow diagram, which represents a sequence of operations that can be implemented in software and executed in hardware. In the context of software, the blocks represent computer-executable instructions that, when executed by one or more processors, perform the recited operations. Generally, computer-executable instructions include routines, programs, objects, components, data structures, and the like that perform functions and/or implement particular abstract data types. The order in which the operations are described is not intended to be construed as a limitation, and any number of the described blocks can be omitted and/or combined in any order and/or in parallel to implement the processes. For discussion purposes, the process 300 may be described with reference to the wireless network environment 100 of FIG. 1, however other environments may also be used.

At operation 302, a CSCF may receive a service request from a user device. For example, a CSCF may be configured in a restricted access network, such as a MAS network (e.g., MAS network 101 of FIG. 1). A user device that is not authorized to access wireless services on that network may nevertheless generate and transmit a request for services, such as a SIP request for IMS services, to the network.

In response to receiving the request for services at operation 304 the CSCF may determine a home network and/or HSS associated with the user device and generate a MAR requesting registration for the user device. The CSCF may transmit the MAR to a VPLMN DRA using the Cx interface.

At operation 306, the VPLMN DRA may determine if the MAR was received on the Cx interface. The VPLMN DRA may also, or instead, determine whether the MAR meets one or more other criteria. For example, the VPLMN DRA may determine whether a destination network and/or HSS associated with the MAR is an authorized or otherwise not prohibited network or HSS. If the MAR is not associated with the Cx interface and/or is not authorized based on other criteria, the VPLMN DRA may drop the MAR or otherwise not route the MAR to the destination, blocking the signaling at operation 316.

If the VPLMN DRA determines that the MAR was received on the Cx interface and/or that criteria for continued transmission of the MAR has been met, at operation 308 the VPLMN DRA may transmit the MAR to an IPX and/or to another destination for relay to the destination network or HSS.

At operation 310, an HPLMN DRA at the destination (e.g., UE's home) network may receive the MAR (e.g., via an IPX) and may determine if the MAR was received on the Cx interface. The HPLMN DRA may also, or instead, determine whether the MAR meets one or more other criteria. For example, the HPLMN DRA may determine whether the source network and/or CSCF associated with the MAR is an authorized or otherwise not prohibited network or CSCF. If the MAR is not associated with the Cx interface and/or is not authorized based on other criteria, the HPLMN DRA may drop the MAR or otherwise not route the MAR to an HSS, blocking the signaling at operation 316.

If the HPLMN DRA determines that the MAR was received on the Cx interface and/or that criteria for continued transmission of the MAR has been met, at operation 312 the HPLMN DRA may transmit the MAR to an HSS for registration operations.

At operation 314, the HSS may perform one or more registration operations (e.g., register, determine not to register, etc.) based on the MAR. Based on such operations, the HSS may generate and transmit an MAA to the user device (e.g., using the Cx interface), for example, via the DRAs, IPX, and CSCF traversed during the transmission of the MAR. At one or more of such components (or other components), the MAA may also be evaluated to determine if it is associated with the Cx interface and/or if it is associated with an authorized network (omitted from figure). Alternatively, the MAA may be provided to the user device and/or the source CSCF regardless of interface and/or network, relying on the initial checking of the MAR to ensure that the registration request was permitted. The MAA may be stored, for example in a database at the MAS network, for use in determining a location and/or identity of the associated user device.

In summary, by more efficiently and selectively routing registration traffic based on interface and/or other criteria, the disclosed systems and techniques may be able to increase the efficiency of usage of MAS network resources and other wireless network resources and improve the performance of both the network and user devices.

Example User Equipment

Figure 4:
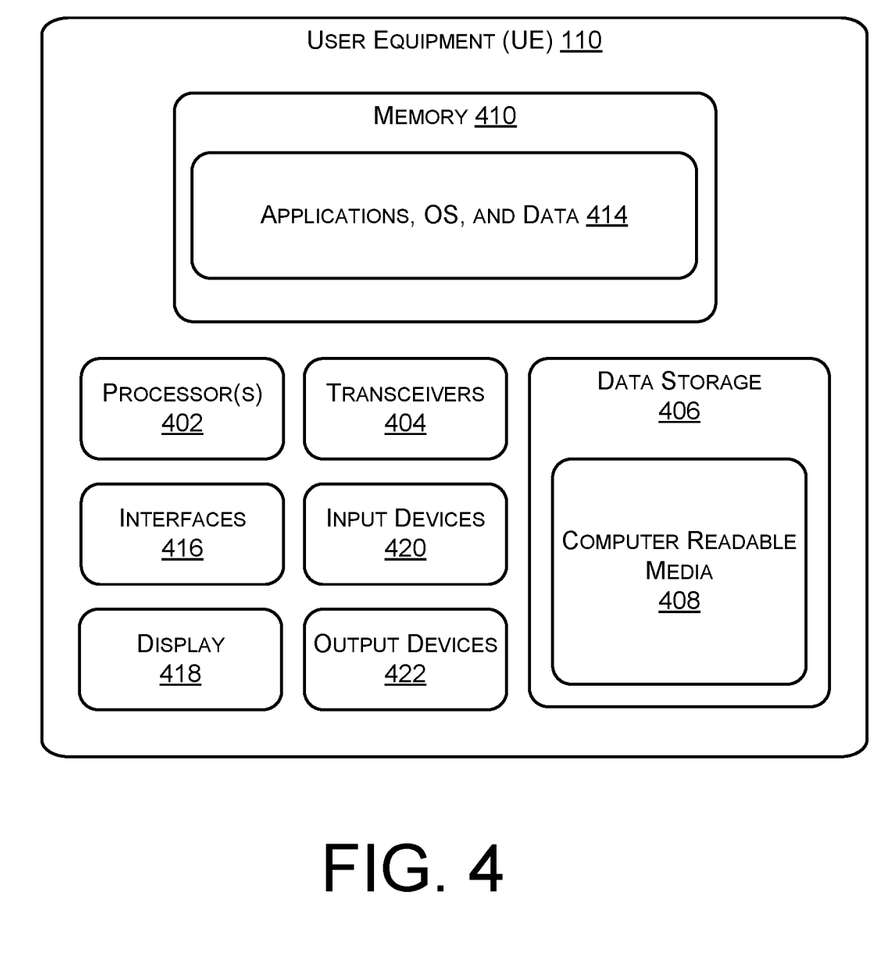
FIG. 4 is a schematic diagram of illustrative components in an example user device that is configured for performing inter-network registration, in accordance with examples of the disclosure.

FIG. 4 is an example of a UE, such as UE 110, for use with the systems and methods disclosed herein, in accordance with some examples of the present disclosure. The UE 110 may include one or more processors 402, one or more transmit/receive antennas (e.g., transceivers or transceiver antennas) 404, and a data storage 406. The data storage 406 may include a computer readable media 408 in the form of memory and/or cache. This computer-readable media may include a non-transitory computer-readable media. The processor(s) 402 may be configured to execute instructions, which can be stored in the computer readable media 408 and/or in other computer readable media accessible to the processor(s) 402. In some configurations, the processor(s) 402 is a Central Processing Unit (CPU), a Graphics Processing Unit (GPU), or both CPU and GPU, or any other sort of processing unit. The transceiver antenna(s) 404 can exchange signals with a base station, such as eNodeB 120.

The UE 110 may be configured with a memory 410. The memory 410 may be implemented within, or separate from, the data storage 406 and/or the computer readable media 408. The memory 410 may include any available physical media accessible by a computing device to implement the instructions stored thereon. For example, the memory 410 may include, but is not limited to, RAM, ROM, EEPROM, a SIM card, flash memory or other memory technology, CD-ROM, DVD or other optical disk storage, magnetic cassettes, magnetic tape, magnetic disk storage or other magnetic storage devices, or any other medium which may be used to store the desired information and which may be accessed by the UE 110.

The memory 410 can store several modules, such as instructions, data stores, and so forth that are configured to execute on the processor(s) 402. In configurations, the memory 410 may also store one or more applications 414 configured to receive and/or provide voice, data and messages (e.g., SMS messages, Multi-Media Message Service (MMS) messages, Instant Messaging (IM) messages, Enhanced Message Service (EMS) messages, etc.) to and/or from another device or component (e.g., the eNodeB 120). The applications 414 may also include one or more operating systems and/or one or more third-party applications that provide additional functionality to the UE 110. The memory may also, or instead, store bandwidth information, such as UE supported bands, bandwidth(s) and bandwidth parts, as well as communications session information such as UE specific carrier bandwidth(s).

Although not all illustrated in FIG. 4, the UE 110 may also comprise various other components, e.g., a battery, a charging unit, one or more network interfaces 416, an audio interface, a display 418, a keypad or keyboard, and one or more input devices 420, and one or more output devices 422.

Example Computing Device

Figure 5:
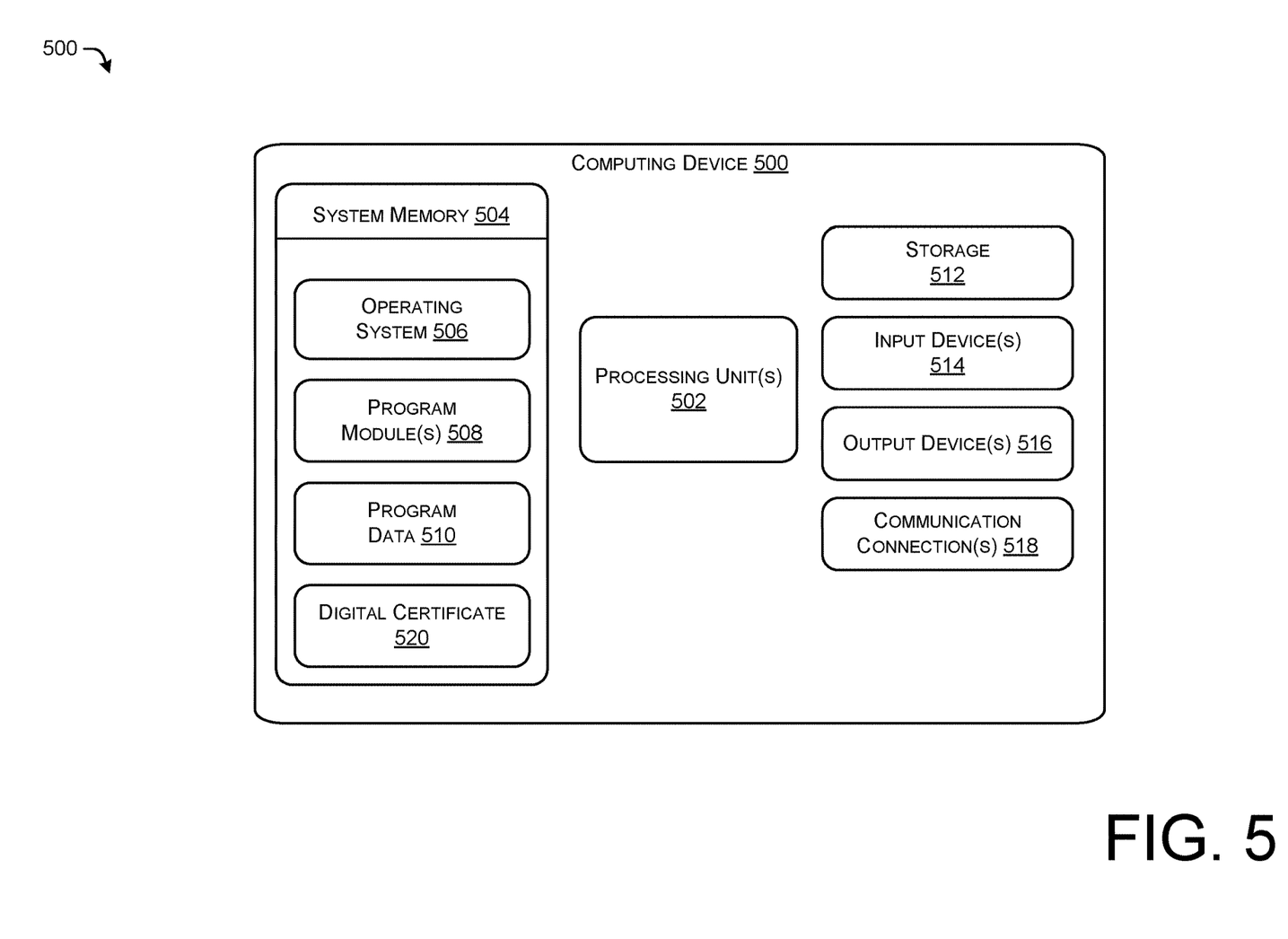
FIG. 5 is a schematic diagram of illustrative components in an example computing device that is configured for performing inter-network registration, in accordance with examples of the disclosure.

FIG. 5 is an example of a computing device 500 for use with the systems and methods disclosed herein, in accordance with some examples of the present disclosure. The computing device 500 can be used to implement various components of a core network, a base station (e.g., gNodeB 120), and/or any servers, routers, gateways, gateway elements, administrative components, etc. that can be used by a communication provider. One or more computing devices 500 can be used to implement the network 101 or 102, for example. One or more computing devices 500 can also be used to implement base stations and other components.

In various embodiments, the computing device 500 can include one or more processing units 502 and system memory 504. Depending on the exact configuration and type of computing device, the system memory 504 can be volatile (such as RAM), nonvolatile (such as ROM, flash memory, etc.) or some combination of the two. The system memory 504 can include an operating system 506, one or more program modules 508, program data 510, and one or more digital certificates 520. The system memory 504 may be secure storage or at least a portion of the system memory 504 can include secure storage. The secure storage can prevent unauthorized access to data stored in the secure storage. For example, data stored in the secure storage can be encrypted or accessed via a security key and/or password.

The computing device 500 can also include additional data storage devices (removable and/or non-removable) such as, for example, magnetic disks, optical disks, or tape. Such additional storage is illustrated in FIG. 5 by storage 512.

The computing device 500 may store, in either or both of the system memory 504 and the storage 512, bandwidth information, such as available spectrum, available carrier bandwidth, UE supported bands, bandwidth(s) and bandwidth parts, cell specific carrier bandwidth(s), and/or UE specific carrier bandwidth(s) for one or more UEs.

Non-transitory computer storage media of the computing device 500 can include volatile and nonvolatile, removable and non-removable media implemented in any method or technology for storage of information, such as computer readable instructions, data structures, program modules, or other data. The system memory 504 and storage 512 are examples of computer readable storage media. Non-transitory computer readable storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by computing device 500. Any such non-transitory computer readable storage media can be part of the computing device 500.

In various embodiment, any or all of the system memory 504 and storage 512 can store programming instructions which, when executed, implement some or all of the functionality described above as being implemented by one or more systems configured in the environment 100 and/or components of the networks 101 and 102.

The computing device 900 can also have one or more input devices 514 such as a keyboard, a mouse, a touch-sensitive display, voice input device, etc. The computing device 500 can also have one or more output devices 516 such as a display, speakers, a printer, etc. can also be included. The computing device 500 can also contain one or more communication connections 518 that allow the device to communicate with other computing devices using wired and/or wireless communications.

Example Clauses

The following paragraphs describe various examples. Any of the examples in this section may be used with any other of the examples in this section and/or any of the other examples or embodiments described herein.

A: A method performed by a one or more computing devices configured at a managed access system (MAS) network, the method comprising: receiving a request for internet protocol (IP) multimedia services from a mobile device; generating, at a call session control function (CSCF) configured at the MAS network and based at least in part on the request, a multimedia authentication request (MAR); transmitting the MAR from the CSCF to a diameter routing agent (DRA) using a Cx interface; transmitting, based at least on part on receiving the MAR on the Cx interface, the MAR from the DRA to a destination network associated with the mobile device; receiving a multimedia authentication answer (MAA) at the DRA from the destination network; and transmitting the MAA from the DRA to the CSCF.

B: The method of paragraph A, wherein receiving the MAA comprises receiving the MAA on the Cx interface.

C: The method of paragraph B, wherein transmitting the MAA comprises transmitting the MAA based at least in part on receiving the MAA on the Cx interface.

D: The method of any of paragraphs A-C, wherein transmitting the MAR from the DRA to the destination network is further based at least in part on the destination network.

E: The method of any of paragraphs A-D, wherein transmitting the MAR from the DRA to the destination network comprises transmitting the MAR to an IP exchange for transmission to the destination network.

F: The method of any of paragraphs A-E, wherein receiving the MAA at the DRA from the destination network comprises receiving the MAA from a second DRA configured at the destination network.

G: A network computing device configured at a managed access system (MAS) network, the network computing device comprising: one or more processors; one or more transceivers; and non-transitory computer-readable media storing computer-executable instructions that, when executed by the one or more processors, cause the one or more processors to perform operations comprising: receiving, from a call session control function (CSCF) and based at least in part on a request for internet protocol (IP) multimedia services received from a mobile device, a multimedia authentication request (MAR); determining that the MAR was received from the CSCF on a Cx interface; transmitting, based at least on part on determining that the MAR was received from the CSCF on the Cx interface, the MAR to a destination network associated with the mobile device; receiving a multimedia authentication answer (MAA) from the destination network; and transmitting the MAA to the CSCF.

H: The network computing device of paragraph G, wherein the operations further comprise: receiving a second request from the CSCF; determining that the second request was not received from the CSCF on the Cx interface; and discarding, based at least in part on determining that the second request was not received from the CSCF on the Cx interface, the second request.

I: The network computing device of paragraph H, wherein receiving the MAA the destination network comprises receiving the MAA from a diameter routing agent (DRA) configured at the destination network.

J: The network computing device of paragraph I, wherein receiving the MAA from the DRA comprises receiving the MAA from the DRA based at least on determining, by the DRA, that the MAA was received on the Cx interface.

K: The network computing device of paragraph J, wherein receiving the MAA from the DRA is further based at least in part on the MAS network.

L: The network computing device of any of paragraphs G-K, wherein transmitting the MAR to the destination network is further based at least in part on the destination network.

M: The network computing device of any of paragraphs G-L, wherein the request for IP multimedia services comprises a session initiation protocol (SIP) request.

N: The network computing device of any of paragraphs G-M, wherein receiving the MAA from the destination network comprises receiving the MAA from a home subscriber server (HSS) configured at the destination network.

O: A non-transitory computer-readable media storing computer-executable instructions that, when executed by one or more processors, cause the one or more processors to perform operations comprising: receiving, from a call session control function (CSCF) and based at least in part on a request for internet protocol (IP) multimedia services received from a mobile device, a multimedia authentication request (MAR); determining that the MAR was received from the CSCF on a Cx interface; transmitting, based at least on part on determining that the MAR was received from the CSCF on the Cx interface, the MAR to a destination network associated with the mobile device; receiving a multimedia authentication answer (MAA) from the destination network; and transmitting the MAA to the CSCF.

P: The non-transitory computer-readable media of paragraph O, wherein receiving the MAA from the destination network comprises receiving the MAA from a home subscriber server (HSS) configured at the destination network.

Q: The non-transitory computer-readable media of paragraph P, wherein receiving the MAA from the HSS comprises receiving the MAA from a DRA configured at the destination network that received the MAA from the HSS.

R: The non-transitory computer-readable media of paragraph Q, wherein receiving the MAA from the DRA comprises receiving the MAA from the DRA based at least on determining, by the DRA, that the MAA was received from the HSS on the Cx interface.

S: The non-transitory computer-readable media of any of paragraphs O-R, wherein transmitting the MAR to the destination network is further based at least in part on the destination network.

T: The non-transitory computer-readable media of any of paragraphs O-S, wherein the request for IP multimedia services comprises a session initiation protocol (SIP) request.

While the example clauses described above are described with respect to one particular implementation, it should be understood that, in the context of this document, the content of the example clauses can also be implemented via a method, device, system, computer-readable medium, and/or another implementation. Additionally, any of the examples A-T can be implemented alone or in combination with any other one or more of the examples A-T.

CONCLUSION

Depending on the embodiment, certain operations, acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, components, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks, modules, and components described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements, and/or states. Thus, such conditional language is not generally intended to imply that features, elements, and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Unless otherwise explicitly stated, articles such as "a" or "the" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method performed by a one or more computing devices configured at a managed access system (MAS) network, the method comprising:
   receiving a request for internet protocol (IP) multimedia services from a mobile device;
   generating, at a call session control function (CSCF) configured at the MAS network and based at least in part on the request, a multimedia authentication request (MAR);
   transmitting the MAR from the CSCF to a diameter routing agent (DRA) using a Cx interface, wherein the CSCF and the DRA are endpoints of at least a leg of the Cx interface;
   transmitting, based at least on part on receiving the MAR on the Cx interface, the MAR from the DRA to a destination network associated with the mobile device;
   receiving a multimedia authentication answer (MAA) at the DRA from the destination network; and
   transmitting the MAA from the DRA to the CSCF,
   wherein the MAS network and the destination network are separate and distinct networks.

2. The method of claim 1, wherein receiving the MAA comprises receiving the MAA on the Cx interface.

3. The method of claim 2, wherein transmitting the MAA comprises transmitting the MAA based at least in part on receiving the MAA on the Cx interface.

4. The method of claim 1, wherein transmitting the MAR from the DRA to the destination network is further based at least in part on the destination network.

5. The method of claim 1, wherein transmitting the MAR from the DRA to the destination network comprises transmitting the MAR to an IP exchange for transmission to the destination network.

6. The method of claim 1, wherein receiving the MAA at the DRA from the destination network comprises receiving the MAA from a second DRA configured at the destination network.

7. A network computing device configured at a managed access system (MAS) network to implement a diameter routing agent (DRA), the network computing device comprising:
   one or more processors;
   one or more transceivers; and
   non-transitory computer-readable media storing computer-executable instructions that, when executed by the one or more processors, cause the one or more processors to perform operations of the DRA comprising:
   receiving, from a call session control function (CSCF) and based at least in part on a request for internet protocol (IP) multimedia services received from a mobile device, a multimedia authentication request (MAR);
   determining that the MAR was received from the CSCF on a Cx interface, wherein the CSCF and the DRA are endpoints of at least a leg of the Cx interface;
   transmitting, based at least on part on determining that the MAR was received from the CSCF on the Cx interface, the MAR to a destination network associated with the mobile device;
   receiving a multimedia authentication answer (MAA) from the destination network; and
   transmitting the MAA to the CSCF,
   wherein the MAS network and the destination network are separate and distinct networks.

8. The network computing device of claim 7, wherein the operations further comprise:
   receiving a second request from the CSCF;
   determining that the second request was not received from the CSCF on the Cx interface; and
   discarding, based at least in part on determining that the second request was not received from the CSCF on the Cx interface, the second request.

9. The network computing device of claim 7, wherein receiving the MAA from the destination network comprises receiving the MAA from a second DRA configured at the destination network.

10. The network computing device of claim 9, wherein receiving the MAA from the second DRA comprises determining, by the DRA, that the MAA was received on the Cx interface.

11. The network computing device of claim 10, wherein receiving the MAA from the second DRA is further based at least in part on the MAS network.

12. The network computing device of claim 7, wherein transmitting the MAR to the destination network is further based at least in part on the destination network.

13. The network computing device of claim 7, wherein the request for IP multimedia services comprises a session initiation protocol (SIP) request.

14. The network computing device of claim 7, wherein receiving the MAA from the destination network comprises receiving the MAA from a home subscriber server (HSS) configured at the destination network.

15. A non-transitory computer-readable media storing computer-executable instructions for implementing a diameter routing agent (DRA) that, when executed by one or more processors, cause the one or more processors to perform operations of the DRA comprising:
   receiving, from a call session control function (CSCF) and based at least in part on a request for internet protocol (IP) multimedia services received from a mobile device, a multimedia authentication request (MAR);
   determining that the MAR was received from the CSCF on a Cx interface, wherein the CSCF and the DRA are endpoints of at least a leg of the Cx interface;
   transmitting, based at least on part on determining that the MAR was received from the CSCF on the Cx interface, the MAR to a destination network associated with the mobile device;
   receiving a multimedia authentication answer (MAA) from the destination network; and
   transmitting the MAA to the CSCF,
   wherein the MAS network and the destination network are separate and distinct networks.

16. The non-transitory computer-readable media of claim 15, wherein receiving the MAA from the destination network comprises receiving the MAA from a home subscriber server (HSS) configured at the destination network.

17. The non-transitory computer-readable media of claim 16, wherein receiving the MAA from the HSS comprises receiving the MAA from a second DRA configured at the destination network that received the MAA from the HSS.

18. The non-transitory computer-readable media of claim 17, wherein receiving the MAA from the second DRA comprises determining, by the DRA, that the MAA was received from the HSS on the Cx interface.

19. The non-transitory computer-readable media of claim 15, wherein transmitting the MAR to the destination network is further based at least in part on the destination network.

20. The non-transitory computer-readable media of claim 15, wherein the request for IP multimedia services comprises a session initiation protocol (SIP) request.

* * * * *